Dec. 5, 1933.   W. B. McCOLLUM   1,937,831
PLOTTING DEVICE
Filed Sept. 28, 1932   2 Sheets-Sheet 1
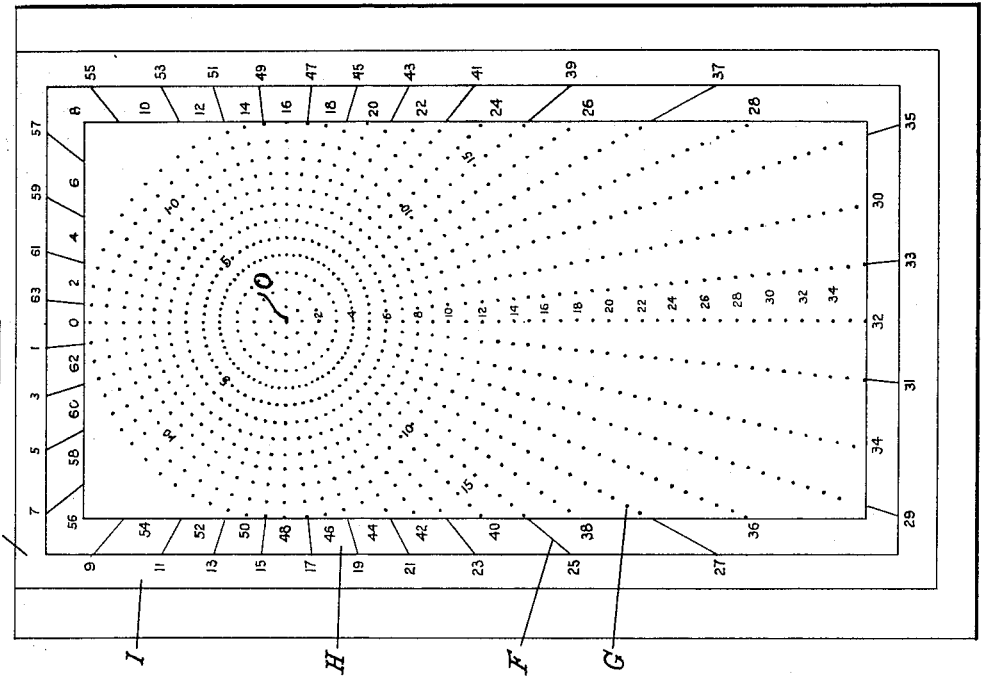
Inventor
William B. McCollum
BY W. N. Roach
Attorney Dec. 5, 1933.  W. B. McCOLLUM  1,937,831
PLOTTING DEVICE
Filed Sept. 28, 1932    2 Sheets-Sheet 2
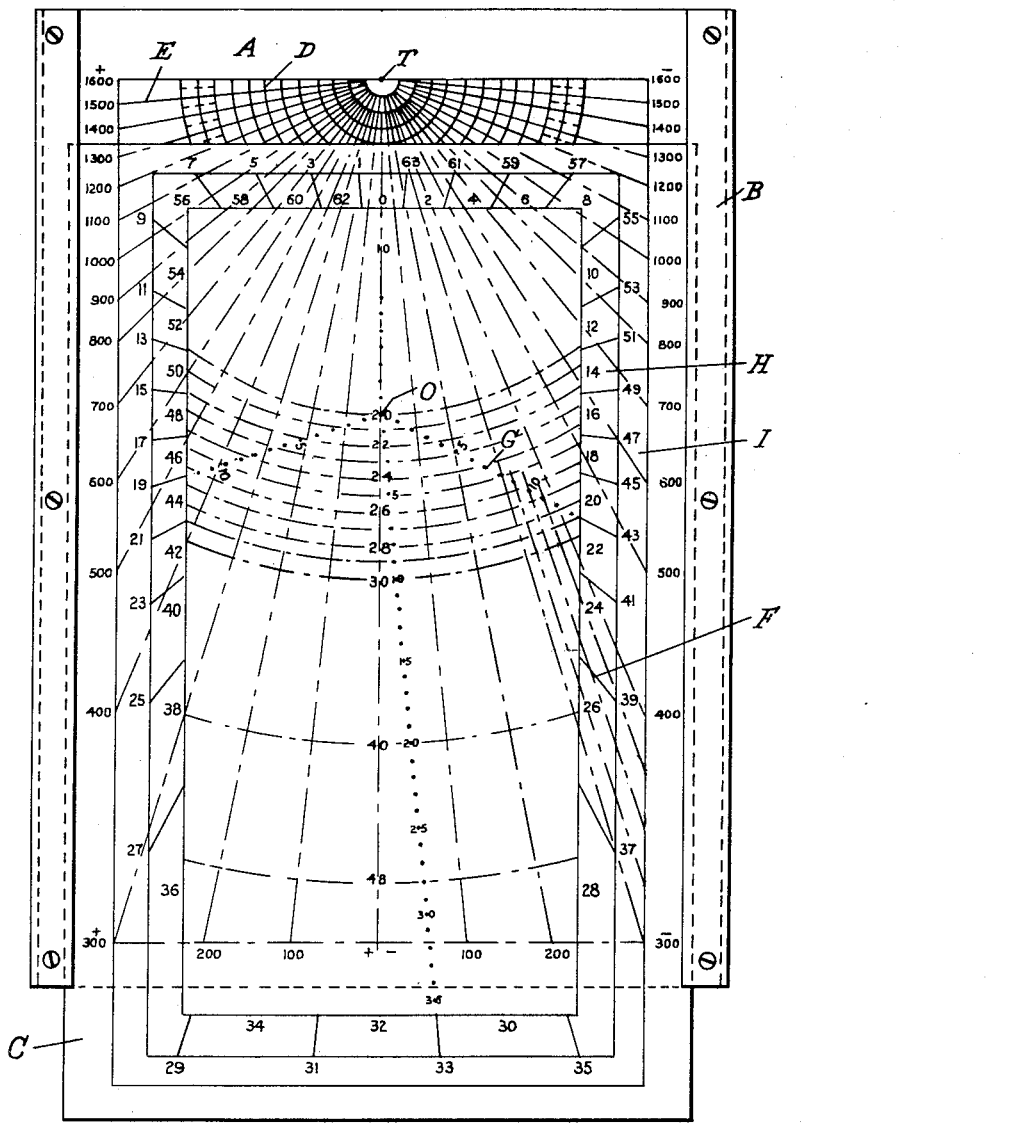
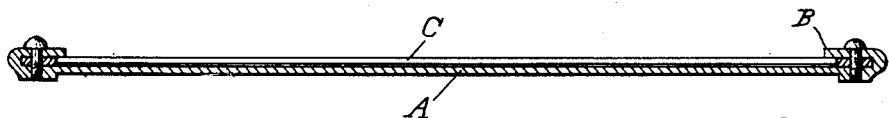
Inventor
William B. McCollum
BY W. N. Roach
Attorney Patented Dec. 5, 1933

1,937,831

UNITED STATES PATENT OFFICE 1,937,831

PLOTTING DEVICE

William B. McCollum, United States Army, Fitzsimons, Colo.

Application September 28, 1932
Serial No. 635,230

3 Claims. (Cl. 33—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a plotting device for determining certain artillery firing data.

The purpose of the invention is to provide a plotting board from which the compass bearing and range from a gun to target may be readily and quickly ascertained by means of data obtained at a remote observing point.

A preferred embodiment of the invention is illustrated in the accompanying drawings in which:

Fig. 1 is a plan view of the base.

Fig. 2 is a plan view of the transparent slide.

Fig. 3 is a plan view of the assembled base and slide, certain indicia being omitted, and Fig. 4 is an end view of Fig. 3.

Referring to the drawings by character of reference.

The device consists generally of a base A having at its sides parallel guides B for receiving a transparent slide C.

The base A is inscribed with a series of curves or arcs D concentric about the point T at the upper end of the base and with a series of angle lines E radiating from the point T. The arcs D commencing with semi-circles are appropriately numbered in terms of range from the point T, and the angle lines E in mils from 0 to 1600, the lower right quadrant being of minus sign and the lower left quadrant being of plus sign.

The transparent slide C is inscribed with a dot O and with a plurality of other dots G, arranged concentrically and radially about the dot O. The dot O is spaced some distance from the upper edge of the slide so that four quadrants with twelve circular series of dots G may be included. The remaining series of the dots G in the lower quadrants are disposed in arcs less than a semicircle. The series of dots G are graduated in terms of range and are plotted on the same scale as the arcs D and angle lines E of the base.

The margin of the slide is inscribed with angle lines F, radiating from the dot O. An inner set of numerals H and an outer set I respectively arranged clockwise and counter-clockwise indicate graduations from 0 to 6400 mils.

In employing the device the point T always represents the target, the point O represents the observing station while the gun is positioned at any one of the dots G.

Referring to Fig. 3 in which some of the indicia are omitted for the sake of clarity, two examples of the employment of the device will be given.

In the first example it is assumed that the observing point is 2000 yards from the target with a compass bearing to the target of 6200 mils and that it is 1100 yards from the gun with a compass bearing of 1900 mils. The gun is therefore to the right and to the rear of the observing point. The difference between the compass bearings is found to be 4300.

With this data available the slide C is moved on the base A until the center dot O, representing the observing station is over the 2000 yard arc D of the base. The gun position is now located by selecting a dot G that is in the circle 1100 yards from the dot O and on the 4300 mil line of the outer scale I. The selected dot overlies the angle line E of the base which has a reading of minus 375 mils. This value is deducted from the compass bearing of 6200, compass bearing of target, and gives a value of 5825 which is the compass bearing of target at the gun. The selected dot G overlies the range arc D of the base and gives a reading of 2700 which is the range in yards from gun to target.

The second example illustrates a method of operation involving halving the range values when they are greater than can be set off on the device. On the basis of the following data: gun to left and rear of observing point, range to target 4000, range to gun 2000, compass bearing to target 200 mils, compass bearing to gun 4700 mils the solution is as follows referring to Fig. 3. Compass bearing difference is 4500.

The slide is moved to place the center dot O over the 2000 yard arc D of the base instead of the 4000 yard arc. The dot G selected on the 4500 mil line of the inner scale H will be at 1000 yards from O instead of 2000. The dot is on the plus 400 angle line from T and when this value is added to the 200 mils compass bearing of target from observing point, the resulting value of 600 will be the compass bearing of target from gun station. The selected dot is over the 2500 yard range arc D. This value is doubled and therefore the range from gun to target is 5000 yards.

In working with similar triangles the angles are unchanged and accordingly the angle readings are employed as read from the charts.

The device can be used for target designation by treating a battery observation point as a gun position.

I claim:

1. In a plotting device, a base marked in two quadrants with concentric range curves and angle lines radiating from the center of said curves, said center being at one end of the base, the angle lines being designated plus in one quadrant and minus in the other, a transparent slide movable over the base and marked in four quadrants with dots defining concentric circles and radial lines about a center said center being spaced from one end of the slide, the arrangement of the dots being on a scale corresponding to the curves and angle lines of the base, and a clockwise and counter-clockwise mil scale about the margin of the slide.

2. In a plotting device, a base marked with concentric range curves and angle lines radiating from the center of said curves, said center being at one end of the base, the angle lines being designated plus in one quadrant and minus in the other, a transparent slide movable over the base and marked with dots defining concentric circles and radial lines about a center said center being spaced from one end of the slide, the arrangement of the dots being on a scale corresponding to the curves and angle lines of the base.

3. In a plotting device, a base marked with concentric range curves and with angle lines radiating from the center of the curves, and a transparent slide movable over the base and marked with a plurality of dots defining concentric circles and radial lines in correspondence with and on the same scale as the curves and angle lines of the base.

WILLIAM B. McCOLLUM.